United States Patent [19]

Stefani

[11] B 3,997,820

[45] Dec. 14, 1976

[54] ANGLED ASSEMBLY OF PCB DIMMER

[75] Inventor: Joseph P. Stefani, Warwick, R.I.

[73] Assignee: General Electric Company, New York, N.Y.

[22] Filed: Dec. 11, 1974

[21] Appl. No.: 531,566

[44] Published under the second Trial Voluntary Protest Program on March 16, 1976 as document No. B 531,566.

[52] U.S. Cl. .............................. 317/120; 338/198; 339/193 P; 315/DIG. 4
[51] Int. Cl.² ........................................ H05K 7/14
[58] Field of Search ............... 323/22; 315/DIG. 4; 200/297; 174/53; 338/128, 198, 199, 200; 317/99, 100, 120, 101 R, 101 CB; 339/17 C, 17 LC, 193 P

[56] References Cited

UNITED STATES PATENTS

| 3,131,988 | 5/1964 | Jensen | 339/193 P |
|---|---|---|---|
| 3,328,676 | 6/1967 | Slater | 315/DIG. 4 |
| 3,569,788 | 3/1971 | Niblack | 317/99 |
| 3,746,923 | 7/1973 | Spira | 338/198 |
| R26,119 | 12/1966 | Slater | 315/DIG. 4 |

*Primary Examiner*—Gerald P. Tolin
*Attorney, Agent, or Firm*—Paul E. Rochford; Walter C. Bernkopf; Frank L. Neuhauser

[57] ABSTRACT

A light dimmer product is provided having simpler construction and simpler assembly than prior art dimmers. Simplicity of construction is achieved by providing a printed circuit board and mounting all electrical leads from components to the board to permit a single soldering operation to solder all leads simultaneously. Simplicity of assembly is achieved by mounting portions other than current carrying portions to the mounting bracket of the dimmer product as a subassembly to be assembled to the housing. When assembled, the bracket support components by portions other than current carrying portions and the current carrying portions of these same components support the printed circuit board. The printed circuit board supports other components by their current carrying portions.

5 Claims, 8 Drawing Figures

ANGLED ASSEMBLY OF PCB DIMMER

CROSS REFERENCE TO RELATED APPLICATIONS

The present application discloses a switch structure which is the subject matter of copending patent application of Joseph P. Stefani and David L. Walsh, Ser. No. 509,861, filed Sept. 27, 1974 and assigned to the same assignee as this application. The present application also discloses a mounting for a solid state device which is the subject of U.S. Pat. No. 3,801,874 of Joseph P. Stefani, Ser. No. 301,849, filed Oct. 30, 1972.

BACKGROUND OF THE INVENTION

It is known in the art that dimmer structures depend for their operation on the components which are incorporated within the dimmer and on the operating conditions, particularly temperature of these units during the operation of the device. An early patent to Slater, U.S. Pat. No. 3,103,618 discloses a dimmer structure as well as the general operation of a dimmer. Later patents disclose structural details of dimmer units and these include disclosure of components included within dimmers as well as the construction of dimmer housings and circuitry and other control elements. A Balen patent, for example, deals with the emission of heat from the dimmer structure and other patents are known in the art which also deal with operating aspects of the dimmer units. Other patents which are concerned with structural aspects of dimmers and dimmer components include a U.S. Pat. No. 3,801,874 which teaches a structure by which an isolated mounting for a semiconductor device is achieved in relation to a mounting strap of a dimmer switch structure. Also, the U.S. Pat. No. 3,785,212 concerns a mechanism for accomplishing ON-OFF switching within a dimmer unit. Both of these latter patents are assigned to the same assignee as this application.

This latter U.S. Pat. No. 3,785,212 patent was in fact an improvement over an earlier patent U.S. Pat. No. 3,657,936, concerned with dimmer ON-OFF switching and also assigned to the same assignee as this application.

Other patents concerned with the circuitry of dimmer type switches are disclosed in U.S. Pat. Nos. 3,447,067 and 3,493,848 and earlier forms of dimmer units are disclosed in U.S. Pat. Nos. 3,248,643 and 3,292,007 also assigned to the same assignee as this application.

In most of the structures disclosed by these patents, there is a structural or electrical improvement of a specific type. There is, however, no overall improvement in the arrangement, housing, assembly and organization of the several components on which reliable dimmer operation depends.

OBJECTS OF THE INVENTION

It is accordingly one object of the present invention to provide a dimmer of simple overall construction than prior art dimmers.

It is another object to provide a dimmer having good dissipation of heat produced within the device.

It is another object to provide a dimmer which can be assembled with facility and with simplicity at low cost.

It is another object to provide a highly stable dimmer structure at low cost.

It is another object to solder all conductive portions of the components to a printed circuit board in a single operation.

It is still another object of the invention to provide a printed circuit board and electrical dimmer components assembled together in which the electric components are held to the board by gravity and self-jigging spring bias preparation to soldering thereof.

SUMMARY OF THE INVENTION

In one of its broader aspects, objects of this invention can be carried out by providing an insulating box-like housing for a dimmer with side, end and bottom walls and with a top opening. A plate-like mounting bracket is attached to the housing to close the opening. A printed circuit board is mounted within the housing proximate one side wall. A plurality of electronic dimmer components are within the housing and these include a solid state switch, a potentiometer and a mechanical switch. All of the electronic dimmer components are mounted by their respective electric contact portions in the printed circuit board. The switch, potentiometer and solid state switch are mounted by portions other than current carrying portions to the closure.

BRIEF DESCRIPTION OF THE DRAWINGS

The application will be understood with greater clarity by reference to the accompanying drawings in which.

DESCRIPTION OF THE PREFERRED EMBODIMENT

Figure 1:
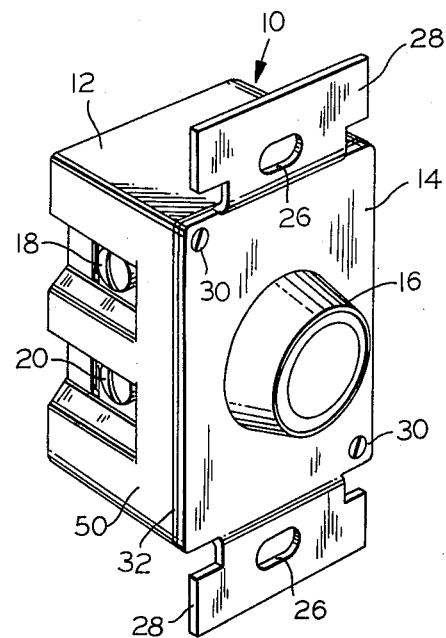
FIG. 1 is a perspective veiw of a dimmer device as provided pursuant to this invention.

A dimmer 10 includes a housing 12 and a metal mounting bracket 14. Control of the electronic elements within the dimmer is accomplished by turning of the control knob 16. Screw terminals 18 and 20 are apparent in the side of the dimmer housing 12 and access to them is through the respective openings 22 and 24. Mounting of the dimmer structure in a conventional wall box, not shown, is accomplished by extending mounting screws, also not shown, through the screw openings 26 in the ends 28 of a mounting bracket 14. Assembly screws 30 are employed to mount the bracket 14 and an insulating spacer 32 beneath the bracket to the housing 12.

Figure 2:
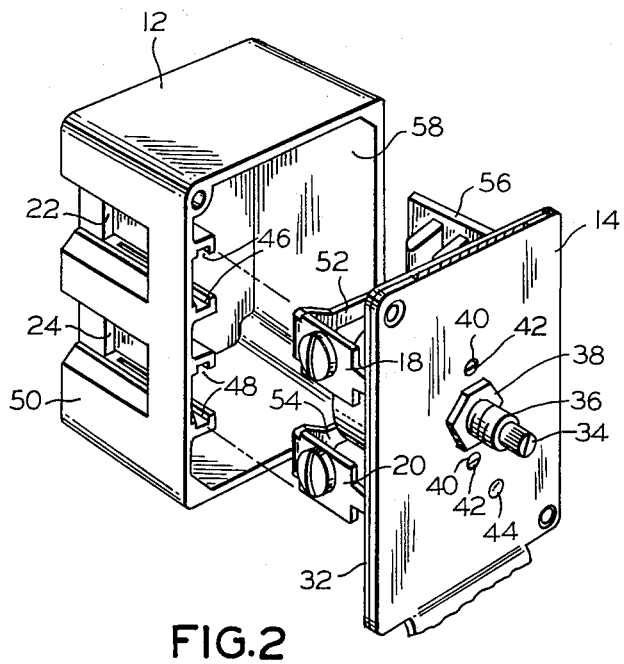
FIG. 2 is an exploded view of a dimmer as illustrated in FIG. 1 with the knob and end portions of the mounting strap removed to improve clarity of the illustration.

Considering next FIG. 2, the dimmer of FIG. 1 is illustrated in exploded fashion with the ends 28 of the mounting bracket omitted to simplify the illustration. As is evident from the figure, a control shaft 34 extends from an externally threaded collar 36 and the collar in turn extends through a central opening in the bracket 14. An assembly nut 38 threaded on collar 36 holds the collar and control shaft 34 in place on the exterior surface of bracket 14. The holes 40 above and below the shaft receive locator bosses 42 of the potentiometer and switch to locate the device on the internal surface of the bracket 14 and spacer 32. A rivet 44 extends through the plate and holds a solid state switching device securely in place to the plate 14 in heat transfer contact therewith as explained more fully in U.S. Pat. No. 3,801,874.

Behind the bracket 14 and insulating spacer 32, and mounted to the bracket, are the various electrical and electronic components of the dimmer. Two screw terminals 18 and 20 are shown poised in position to be inserted in the channels 46 and 48 respectively in the internal surface of the dimmer side wall 50. The channels 46 and 48 are tapered to permit easy entry of the terminals 18 and 20 into the respective channels and to permit the secure positioning of the terminals in the respective openings 22 and 24 of the housing 12. The terminals 18 and 20 are connected by their respective integral conductor arms 52 and 54 to a printed circuit board 56 just visible above the truncated bracket 14 of FIG. 2. A clearer view of some of the parts behind the bracket 14 and attached to the circuit board 56 is given with reference to the other figures.

As will be evident in the description which follows a unique feature of the dimmer construction of the present invention is that all of the electrical and electronic components of the dimmer are mounted by their conductors to a single printed circuit board 56, and that all the mechanical and thermal linkages of the components are made to the mounting bracket 14 with its conforming insulating spacer 32 and the related insulating wafer between the solid state switch 64 and the bracket 14. Because of this simple and unique mounting of the various components, the components are assembled very simply, very reliably, and very economically. Moreover, the structure which is formed is a strong, firm, easily handled, compact assemblage which is readily assmebled to the housing 12 or removed from it as a unitary structure.

Figure 3:
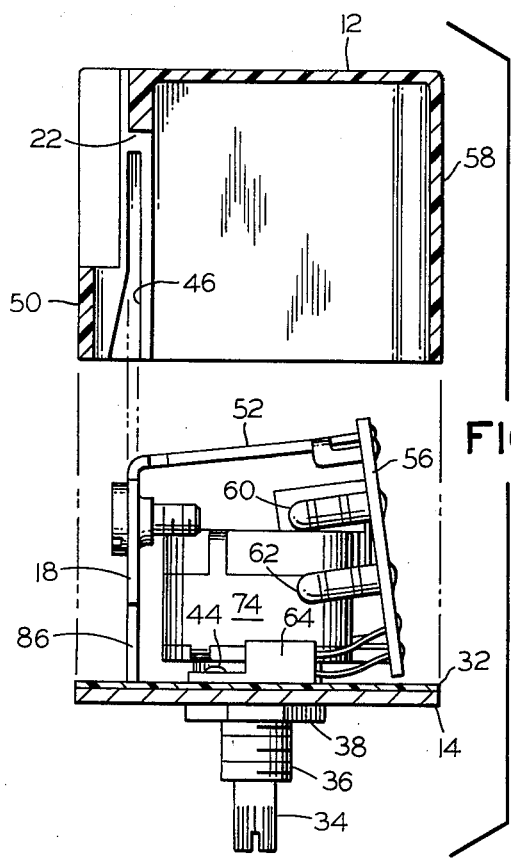
FIG. 3 is a sectional end view of a dimmer in exploded array such as illustrated in FIG. 2 but with the housing sectioned to illustrate internal parts.
Figure 4:
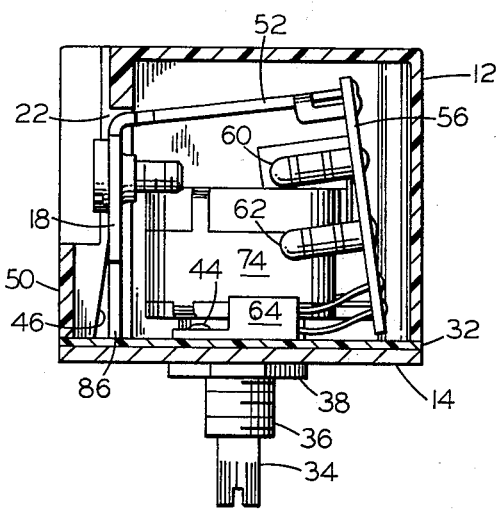
FIG. 4 is a sectional end view as in FIG. 3 but with the dimmer parts assembled.

This structure is illustrated in the lower portion of FIG. 3 in a position to be assembled with the housing 12 shown in the upper portion of FIG. 3. The printed circuit board 56 is shown at the right and the circuit board is disposed at an angle to the vertical so that the portion of the board more remote from the bracket 14 is spaced at a greater distance from the side wall 58 of housing 12. This angular spacing of the printed circuit board 56 from side wall 58 aids both in the assembly of the mounted components into the housing and in the distribution of heat within the dimmer housing as well as in dissipation from the housing. The mounting of individual electronic and individual electrical components of the dimmer circuit to the circuit board is illustrated both in the FIGS. 3, 4, and 6. Two capacitors 60 and 62, a solid state switch unit enclosed within a housing 64, a diac 66, a coil 68 and the forked ends 70 and 72 of the arms 52 and 54 of the terminals 18 and 20 are each mounted by the respective ends of conductors thereof to the printed circuit board through holes provided in the board. The combined switch and potentiometer 74 is shown in FIGS. 3 and 4 but is omitted in FIG. 6 to aid in clarity of illustration. Only the electrical contacts 76, 78, 80, 82, and 84 of the combined switch and potentiometer being shown disposed in the respective conforming holes in printed circuit board 56.

A foot 86 at the lower end of the terminal 18 holds the terminal at a defined distance from the insulating backing 32 so that as the assembly shown in the lower portion of FIG. 3 is assembled into the housing the terminal 18 and 20 are urged into full entry into the channel 46 of the opening 22 within the side wall 50 of housing 12. A very positive positioning is obtained in this way.

Figure 5:
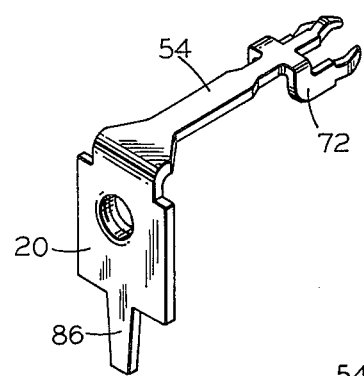
FIG. 5 is a perspective view of a screw terminal strip.
Figure 6:
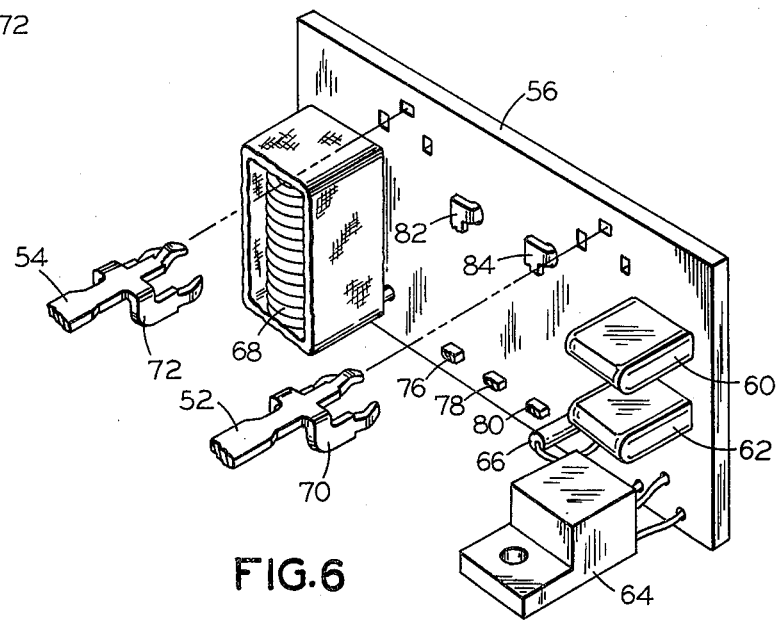
FIG. 6 is an exploded perspective view of a circuit board having components shown assembled thereto and other components poised to be assembled thereto.

The terminals 18 and 20 with their integral feet 86 and 88, their strips 52 and 54, their fingered ends 70 and 72 are cumbersome to handle and to hold in place. To assist in assembly the fingers of end 72 as shown in FIGS. 5 and 6 are curved at their ends slightly inward toward each other and are bent outward. The bending and curving result in an easy entry of the fingers into the respective holes in the printed circuit board 56 and also results in the fingers exerting spring bias against the holes in different directions so that the strip is held securely in place as the soldering operation is carried out.

Figure 7:
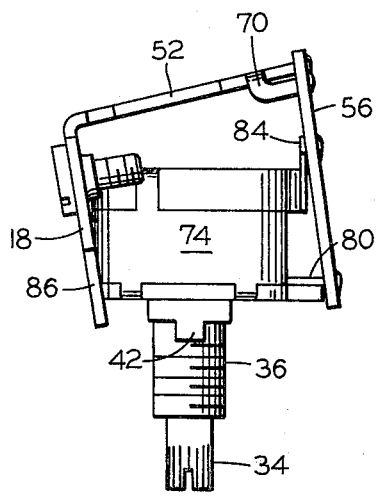
FIG. 7 is an end view of a sub-assembly prior to combination of a mounting strap therewith.
Figure 8:
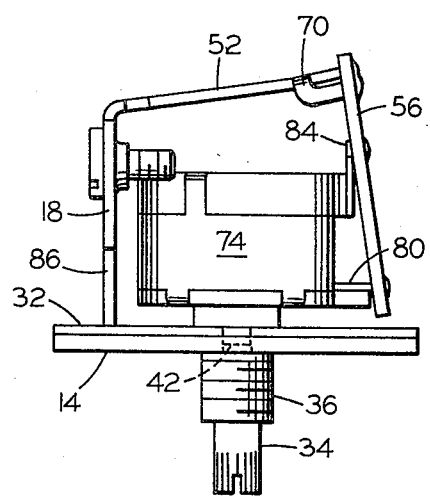
FIG. 8 is a veiw similar to that of FIG. 7 but with the mounting strap assembled in place.

In FIGS. 7 and 8, electronic components are omitted to simplify and clarify the illustration.

It is evident from FIG. 8 that the contacts extending from combined switching and potentiometer are longer at the lower portion and shorter at the upper portion. The net result is that the printed circuit board 56 is pitched at an angle to both sides of the housing rather than being parallel. Also the printed circuit board is less than perpendicular to the mounting bracket 14. There is in other words elements of design in and cooperation between the current carrying portions of the electric components and the printed circuit board so that the board is supported in a preferred orientation relative to the electric components such as combined potentiometer and switch 74 and to the bracket 14 and housing 12.

In the particular illustration shown, the potentiometer and ON-OFF switch 74 is in a generally cylindrical housing described more fully in copending application for patent Ser. No. 509,861, filed Sept. 27, 1974. The unit 74 is securely held to the mounting bracket 14 by the nut 38 securely threaded onto collar 36. The conductors extending from unit 74 hold circuit board 56 at a preferred angled position and the circuit board holds strips 52 and 54 with screw terminals 18 and 20 in a preferred position for mounting into housing 12 with the cooperation of feet 86 and 88 pressing against spacer 32 and in turn against bracket 14.

Accordingly, a high degree of cooperation of the several elements of the dimmer aids in assembly of the device, in its reliable performance and in its relatively low cost.

What is claimed as new and desired to be secured by Letters Patent of the United States is:

1. A dimmer construction comprising:
   a. a box-like housing having side, end and bottom walls, and having a top opening,
   b. a plate-like mounting bracket disposed over said top opening as a closure for said opening,
   c. a printed circuit board mounted within said housing and extending back from said closure proximate one side wall of said housing,
   d). a plurality of electronic dimmer components including a solid state switch, and potentiometer and a mechanical switch in said housing, e. all of said components being mounted by the electric contact portions thereof to said printed circuit board,
f. the switch, potentiometer and solid state switch being mounted by portions other than current carrying portions thereof to said closure,
g. two conducting strips included in said housing,
h. each strip being soldered at one end to said printed circuit board,
i. and each strip being provided at its other end with a screw terminal,
j. said screw terminals being mounted in conforming side wall openings in the side wall opposite that proximate the printed circuit board.

2. The dimmer construction of claim 1 in which the potentiometer and ON-OFF mechanical switch are in one housing of generally cylindrical configuration, in which a control shaft extends axially from the housing and through the mounting bracket, and in which electrical connections of said On-OFF switch extend through the printed circuit board and are longer at the potentiometer housing near the shaft and are shorter at the opposite end of the potentiometer housing.

3. The dimmer construction of claim 1 in which the soldered end of each conducting strip is forked and the prongs of the fork extend through conforming openings in the printed circuit board and are soldered to said board.

4. The dimmer construction of claim 3 in which the prongs of the forked end of the conducting strips exert a compressive spring pressure on the portion of the circuit board proximate the fingers.

5. The dimmer construction of claim 1 in which the printed circuit board is pitched at an angle to the mounting bracket to increase the separation between circuit board and housing side wall at greater distances from said mounting bracket.

* * * * *